April 14, 1925.
S. O. WHITE
AUXILIARY TRANSMISSION
Filed April 14, 1921
1,533,531
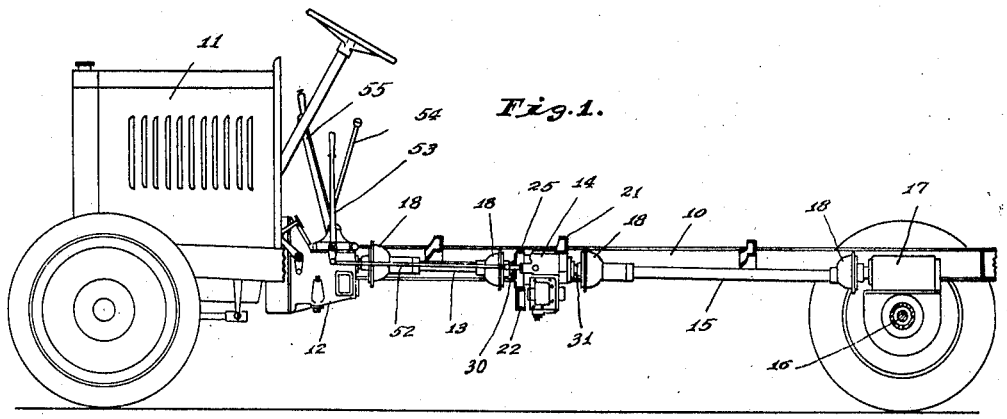
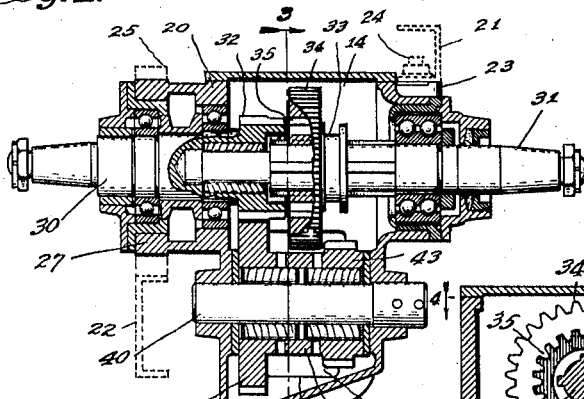
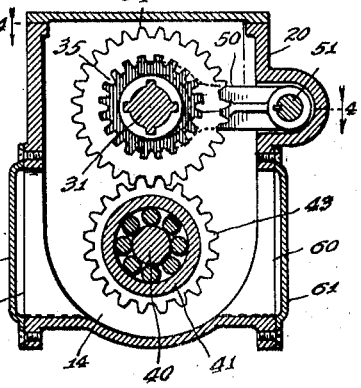
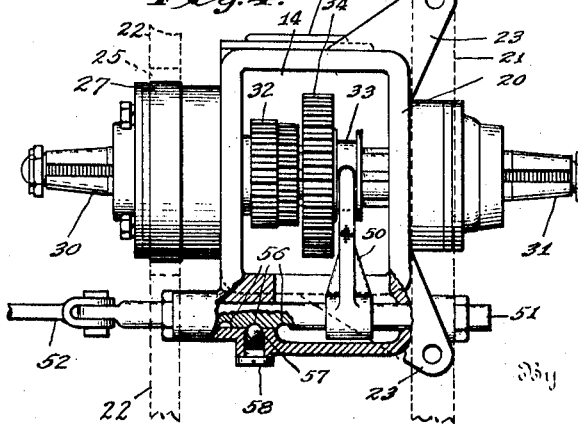
Inventor
Samuel O. White,
Attorneys Patented Apr. 14, 1925.

1,533,531

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

AUXILIARY TRANSMISSION.

Application filed April 14, 1921. Serial No. 461,289.

*To all whom it may concern:*

Be it known that I, SAMUEL O. WHITE a citizen of the United States, residing at Muncie, in the county of Delaware and State of Indiana, have invented a new and useful Auxiliary Transmission, of which the following is a specification.

It is found in the operation of trucks, especially those equipped with pneumatic tires, that a plurality of ranges of speed are desirable; as in order to get the most out of a truck on smooth roads a relatively high range of speeds, with its several variations, is desirable, but this range of speeds does not give sufficient tractive effort when the going is heavy, as in mud or sand or on upgrades, and for these conditions a lower range of speeds with its several variations is desirable.

Auxiliary transmission mechanism for meeting these conditions have already been proposed.

It is the object of my invention to improve the construction, mounting, and control of such an auxiliary transmission mechanism, whereby it may be a separate unit independently supported from the frame to avoid interference between such auxiliary transmission unit on the one hand and the frame or the other parts of the transmission on the other hand, whereby other devices may conveniently be drivingly associated with the engine through such auxiliary transmission, and whereby the control mechanism for such auxiliary transmission may be conveniently associated with the other controlling apparatus, such as the main gear-shift lever and the brake, so that the operator has easy access to them all but is guarded against the liability of mistake in their operation.

The accompanying drawing illustrates my invention: Fig. 1 is a side elevation of a truck chassis, with part of the frame broken away, showing the mounting of my improved transmission mechanism; Fig. 2 is a vertical central longitudinal section through such auxiliary transmission mechanism; Fig. 3 is a transverse section, on the line 3—3 of Fig. 2; and Fig. 4 is a horizontal section on the line 4—4 of Fig. 3, showing many of the parts in elevation.

The chassis 10 has the usual engine beneath the hood 11, which engine is connected through a main transmission mechanism 12 to a rearwardly extending transmission shaft 13, which is connected through my auxiliary transmission mechanism 14 to a second transmission shaft 15 suitably drivingly connected to the rear axle 16, as through a worm drive 17 as indicated. At each end of each shaft 13 and 15, where such shaft is associated with its driving or driven mechanism, there is a universal joint 18, and one of the universal joints associated with each of said shafts is arranged to permit relative axial movement of such shaft with respect to the part connected to such shaft by such joint. By this arrangement all necessary relative movement between the main and auxiliary transmission mechanisms and between the auxiliary transmission mechanism and the rear axle, such as may be caused by the spring movement or by the frame twisting in operation, is amply provided for.

The auxiliary transmission mechanism 14 has a main supporting casing 20, which carries all the parts of such auxiliary transmission. This casing is supported from the chassis 10 independently of the remainder of the transmission devices, and is carried by a three-point support which permits all necessary relative movement between such casing and the chassis. To this end, the chassis has among its cross members two cross members 21 and 22, which cross the power-transmission line at the rear and at the front end respectively of the casing 20. The cross member 21 preferably passes above such casing, and the casing has two obliquely rearwardly projecting arms 23 which are bolted by bolts 24 to separate points on such cross member 21. This furnishes two of the points of support for the casing 20. The cross member 22 preferably passes below the front end of the casing 20, though it is not necessary that it be below, and is provided with a trunnion collar 25 which slips over and has a rotatable fit upon an annular forward extension 27 of such casing 20. This trunnion collar 25 provides the third point of support for the casing, and permits such casing to turn within such trunnion collar as required by the twisting of the frame during operation.

The casing 20 supports in its upper part in suitable bearings two alined shafts 30 and 31, and preferably the forward end of the shaft 31 has a bearing support in the rearward end of the shaft 30. These two shafts 30 and 31 are connected, through the universal joints 18, to the rearward and forward ends of the transmission shafts 13 and 15 respectively. A pinion 32 is fixed on the rear end of the shaft 30, and a sleeve 33 is splined on the forward end of the shaft 31 and is provided with external gear teeth 34 and internal gear teeth 35. The internal gear teeth 35 constitute an internal gear mating with the pinion 32, the two sets of teeth corresponding in number and spacing, so that when the sleeve 33 is slid forward the internal gear teeth 35 interlock with the rearward ends of the teeth of the pinion 32, which has a greater axial length than is necessary for its gear action; this clutches the two shafts 30 and 31 together for direct driving.

A stud shaft 40 is fixed in the casing 20, in the preferred form shown being directly beneath the shafts 30 and 31, and carries on suitable bearings a sleeve 41 with which a gear 42 and pinion 43 are integral. The gear 42 meshes permanently with the forward part of the pinion 32, so that it does not interfere with the rearward or clutching part of the teeth of such pinion. The pinion 43 meshes with the gear teeth 34 when the sleeve 33 is moved to its rearmost position, thus making a speed-reduction connection from the shaft 30 to the shaft 31 for producing large tractive effort.

In addition to its two end positions, where the sleeve 30 is rigidly connected to the sleeve 32 for direct driving or is connected through the gear teeth 34 to the pinion 20 for speed-reduction driving, such sleeve has an intermediate position, or "neutral," in which it is disconnected from both such driving members.

The sleeve 33 is shifted by a fork 50 fixed on a slide rod 51 slidably mounted in the casing 20 at one side of the shafts 30 and 31. The forward end of this slide rod 51 is connected by a link 52 to the lower end of a shifting lever 53 which is mounted on the left hand side of the main transmission mechanism 12, on which the main gear-shift lever 54 is mounted at the center at the top, and which carries a brake lever 55 on its right hand side; so that the main gear-shift lever 54 is between the brake lever 55 and the auxiliary gear-shift lever 53 and all these levers are in a group within easy reach of the driver. To avoid liability of mistake, the grip ends of these levers are all of different shapes—as shown, the main gear-shift lever 54 has a sphere at its upper end, the auxiliary gear-shift lever 53 has a plain tapered handle, and the brake lever 55 has a push button in the end for controlling the locking dog which such brake lever usually has. This puts all three levers under the control of one hand of the operator, which is convenient and is all that is necessary, since it is never necessary to operate two of these levers simultaneously. In order that the operator may "feel" the three positions of the sleeve 33, the slide rod 51 is provided with three notches 56, into any one of which a spring-pressed ball 57 mounted in the casing 20 beneath a screw 58 may engage to position the rod 51 for the corresponding position of the sleeve 33.

The sleeve 41 being directly below the shaft 30 and 31, the gear 42 is free on both sides. This makes a convenient place for taking power from the transmission system. To permit this to be done, the casing 20 is provided on each side opposite the gear 42 with an opening 60, over which is detachably mounted a cover plate 61. By removing a plate 61, any suitable device may be attached in its place, and such device may readily be provided with a gear which meshes with the gear 42. With such device so mounted, it may be driven by the engine as desired, the sleeve 33 being in neutral position if it is desired not to propel the truck at the same time. This driving of such mechanism is through the main transmission mechanism 12, with its several speed variations.

In driving the truck, my auxiliary transmission mechanism provides for doubling the number of speeds obtainable. If the main transmission mechanism 12 provides three speeds forward and one reverse, the auxiliary transmission mechanism permits any of these main-transmission speeds to be transmitted directly from the shaft 13 to the shaft 15 if the sleeve 33 is moved to its forwardmost position, or to be transmitted with a speed reduction through the gear train 32—42—40—34 if the sleeve 33 is moved to its rearmost position thus making six speeds forward and two reverse; and also permits the shaft 13 to be disconnected from the shaft 15 if the sleeve 13 is in neutral position.

This auxiliary transmission mechanism can be readily applied to existing installations, merely requiring two transmission shafts in place of the single old transmission shaft, since it is supported entirely independently of both the main transmission mechanism and the structure on the rear axle.

I claim as my invention:

1. In an automobile the combination with a main transmission mechanism provided with a plurality of speed ratios, of an auxiliary transmission provided with a plurality of speed ratios and including two aligned shafts one of which is driven from the main transmission and a rotatable member in substantially the same vertical plane with the two aligned shafts and adapted to be driven from one of them independently of the other shaft, said rotatable member having a gear accessible on both sides and a casing for said auxiliary transmission mechanism provided with an opening or openings at one or both sides of said gear.

2. In an automobile the combination with a transmission provided with a plurality of speed ratios in one direction and a reversing drive, of an auxiliary transmission mechanism provided with a plurality of speed ratios, said transmission including two aligned shafts one of which is driven from said main transmission mechanism and a rotatable member in substantially the same vertical plane with the two aligned shafts and adapted to be driven from one of them independently of the other, said rotatable member having a gear accessible on both sides and a casing for said auxiliary transmission mechanism provided with an opening or openings at one or both sides of said gear and a removable cover or covers for said openings.

3. In an automobile the combination with a main transmission provided with a plurality of speed ratios in one direction and a reversing control, of an auxiliary transmission mechanism driven from said main transmission mechanism, said auxiliary transmission mechanism including a driving shaft receiving power from said main transmission and a driven shaft operated by said auxiliary transmission and an accessible gear adapted to be operated from said driving shaft independently of the driven shaft and from which a branch line of power may be taken off, and a casing for said auxiliary mechanism provided with an opening or openings through which access to said gear may be obtained.

4. In an automobile the combination with a main transmission provided with a plurality of speed ratios and a reversing drive, of an auxiliary transmission including a driving shaft receiving power from said main transmission, a driven shaft adapted to be driven through the speed changing gears of said auxiliary transmission and a supplemental shaft driven from said driving shaft containing part of the speed changing gears of said auxiliary transmission and adapted to be driven from said driving shaft independently of said driven shaft, said supplemental shaft having an accessible gear from which a branch line of power may be taken off and a casing for said auxiliary mechanism provided with an opening through which access to such gear may be obtained.

In witness whereof, I have hereunto set my hand at Muncie, Indiana, this 11th day of April, A. D. one thousand nine hundred and twenty-one.

SAMUEL O. WHITE.